(12) United States Patent
Liao (10) Patent No.: US 7,933,050 B2
(45) Date of Patent: Apr. 26, 2011

(54) METHOD OF GENERATING AN IMAGE OF A SINGLE DOCUMENT

(75) Inventor: Chun-Chieh Liao, Hsinchu (TW)

(73) Assignee: Avision Inc. (TW)

( * ) Notice: Subject to any disclaimer, the term of this patent is extended or adjusted under 35 U.S.C. 154(b) by 1057 days.

(21) Appl. No.: 11/730,727

(22) Filed: Apr. 3, 2007

(65) Prior Publication Data

US 2007/0236755 A1 Oct. 11, 2007

(30) Foreign Application Priority Data

Apr. 3, 2006 (TW) ................................ 95111726 A (51) Int. Cl.
*H04N 1/387* (2006.01)
*H04N 1/40* (2006.01)
*H04N 1/46* (2006.01)
*G06K 9/36* (2006.01)

(52) U.S. Cl. ........ 358/453; 358/449; 358/450; 358/505; 358/540; 382/289; 382/296

(58) Field of Classification Search ................... 358/449, 358/450, 453, 505, 540; 382/289, 296
See application file for complete search history.

(56) References Cited

U.S. PATENT DOCUMENTS

| 6,002,492 | A | * | 12/1999 | Kamon et al. | ................. 358/450 |
| 6,738,154 | B1 | * | 5/2004 | Venable | ........................ 358/1.15 |
| 7,689,037 | B2 | * | 3/2010 | Handley et al. | ............... 382/173 |

* cited by examiner

*Primary Examiner* — Twyler L Haskins
*Assistant Examiner* — Fred Guillermety

(57) ABSTRACT

A method of generating an image of a single document includes the steps of: transporting a plurality of documents across a scan position one by one; starting reading the documents at the scan position before a first document of the documents reaches the scan position and reading the documents continuously until a last document of the documents is completely transported across the scan position to generate a multi-document analog image; converting the multi-document analog image into a multi-document digital image; and processing the multi-document digital image to generate a plurality of single-document digital images corresponding to the documents.

11 Claims, 12 Drawing Sheets

METHOD OF GENERATING AN IMAGE OF A SINGLE DOCUMENT

BACKGROUND OF THE INVENTION

1. Field of Invention

The invention relates to a method of generating an image of a single document, and more particularly to a method of generating an image of a single document by way of skew correction and image separation.

2. Related Art

When a conventional sheet-fed scanner is performing a sheet-fed scanning operation, a sheet-feeding mechanism transports a plurality of documents across a scan region one by one so that a scanning module of the scanner may scan these documents and acquire the corresponding images. However, when rollers of the sheet-feeding mechanism are worn or the user does not correctly place the documents, a skew or inclination of the document images is particularly likely to occur.

Figure 1:
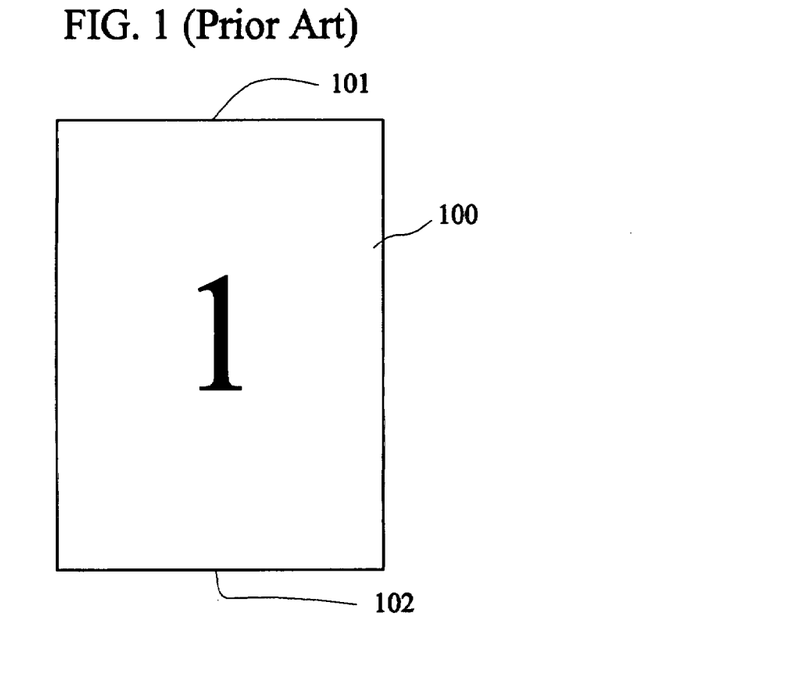
FIG. 1 is a schematic illustration showing a document to be scanned by a conventional sheet-fed scanner.
Figure 2:
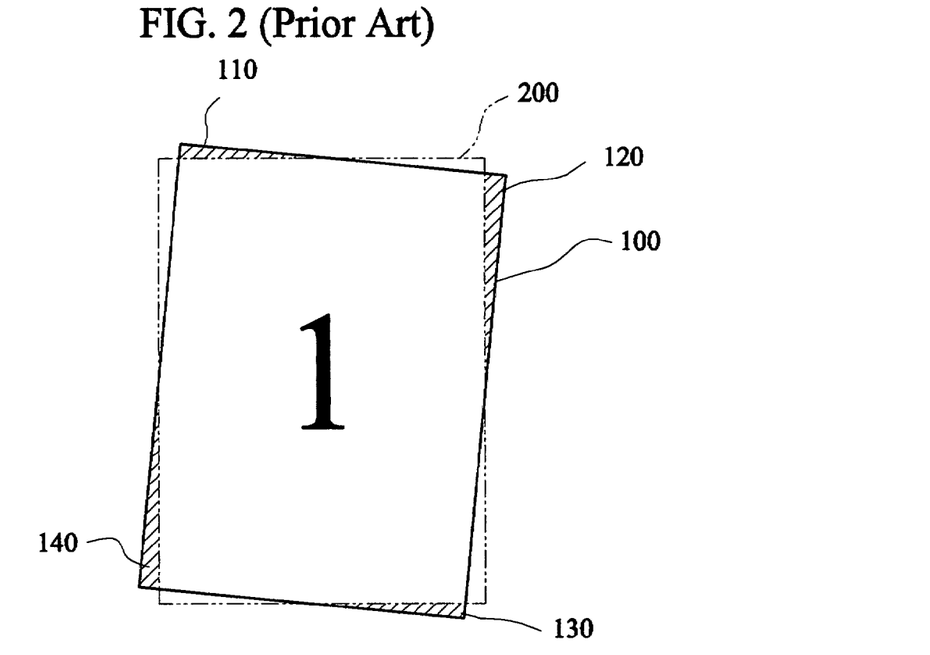
FIG. 2 is a schematic illustration showing an image obtained after the conventional sheet-fed scanner scans a skewed document.
Figure 3:
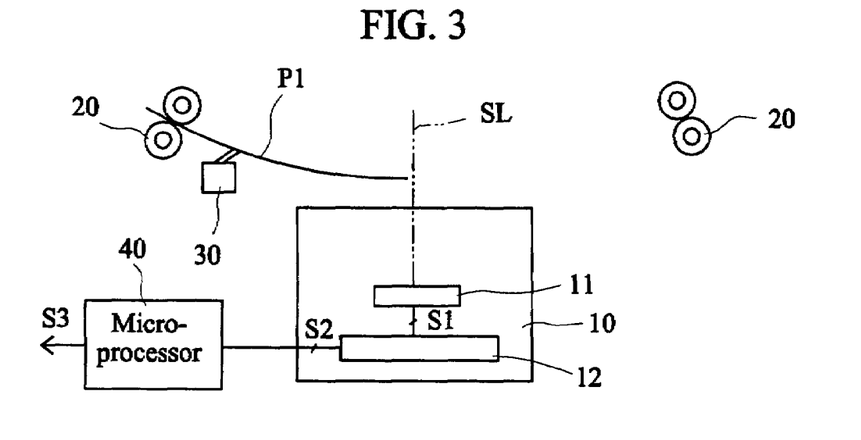
FIGS. 3 to 6 are schematic illustrations showing a sheet-fed scanner using a method of generating an image of a single document according to the invention.

FIG. 1 is a schematic illustration showing a document 100 to be scanned by a conventional sheet-fed scanner. FIG. 2 is a schematic illustration showing a scanned result obtained after the conventional sheet-fed scanner scans the document 100. As shown in FIG. 1, the scanner detects a leading edge 101 of the document 100 by using a document detector. A scanning module of the scanner starts to acquire the image of the document after a period of predetermined time has elapsed or after a stepping motor for driving the sheet-feeding mechanism has rotated by a predetermined number of steps.

However, a detection error might occur when the detector is detecting the leading edge 101 of the document 100, which in result affects the timing of the initiation of the image acquisition. If the scanning module acquires the image too early, the image at a trailing edge 102 of the document may be lost. If the scanning module acquires the image too late, the image around the leading edge 101 of the document may be lost.

In addition to the problem of detection error, the deformation of the image resulting from the skew of the transported document 100 has become a concern of the users. As shown in FIG. 2, four corners 110, 120, 130 and 140 of the document 100 fall outside a scan range 200. Thus, the image data at the four corners 110, 120, 130 and 140 may be lost.

SUMMARY OF THE INVENTION

It is therefore an object of the invention to provide a method of generating an image of a single document, wherein a plurality of documents is scanned in a manner similar to that for scanning a document, and the scan range is enlarged. Then, boundaries are defined and images of the documents are separated according to an image processing procedure, such that a complete image of each document may be obtained.

To achieve the above-identified object, the invention provides a method of generating an image of a single document. The method includes the steps of: transporting a plurality of documents across a scan position one by one; starting reading the documents at the scan position before a first document of the plurality of documents reaches the scan position, and reading the documents continuously until a last document of the documents is completely transported across the scan position to generate a multi-document analog image; converting the multi-document analog image into a multi-document digital image; and processing the multi-document digital image to generate a plurality of single-document digital images corresponding to the documents.

The step of processing the multi-document digital image may include cropping the multi-document digital image or c cropping and de-skewing multi-document digital image. Thus, it is possible to obtain the desired scanned result precisely by way of image processing.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

FIGS. 3 to 6 are schematic illustrations showing a sheet-fed scanner using a method of generating an image of a single document according to the invention. As shown in FIGS. 3 to 6, the sheet-fed scanner of the invention includes a scanning module 10, a sheet-feeding mechanism 20 and a document detector 30. A microprocessor 40, which is usually incorporated in a computer apparatus (not shown) connected to the scanner, or in the scanner, performs an image-separating procedure by implementing software or firmware. The document detector 30 is an element that can be omitted.

The scanning module 10 has a photosensor 11 for converting an optical signal, coming from a document, into an analog electrical signal S1, and a front end processing circuit 12, which is connected to the microprocessor 40, for converting the analog electrical signal S1 into a digital signal S2.

Figure 6:
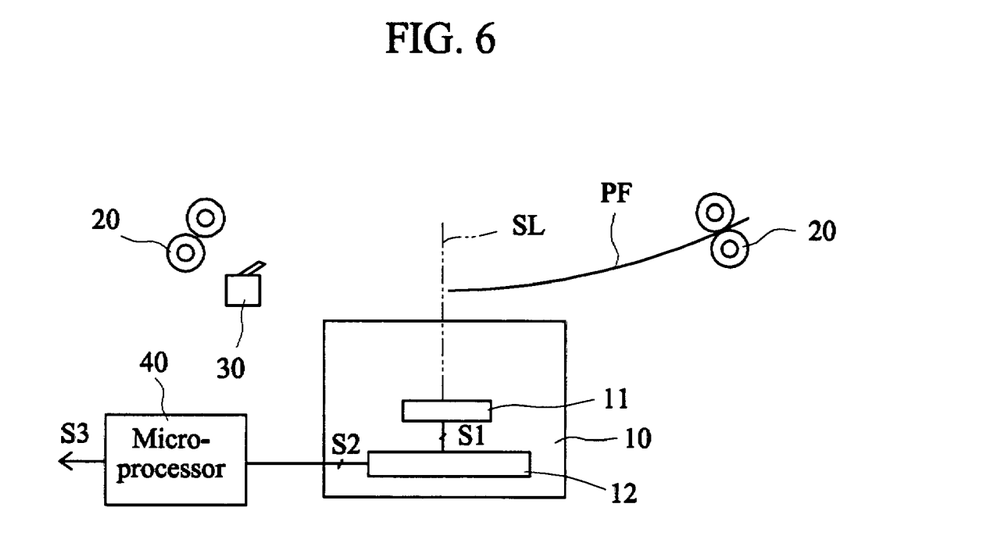

During the scan operation, the sheet-feeding mechanism 20 first transports a first document P1 along a feeding path, and when the document detector 30 disposed on the feeding path detects the presence of the first document P1, the document detector 30 outputs a detection signal to a control circuit (not shown) of the scanning module 10 to initiate the image acquisition procedure. In order to prevent the image around a leading edge of the document from being lost, the scanning module 10 may be designed to start acquiring the image of the first document P1 before the first document P1 reaches a scan position SL (see FIG. 3). The image acquisition procedure continues until a trailing edge of a last document PF has receded from the scan position SL for a period of time, as shown in FIG. 6. If the document detector 30 is not equipped, the image acquisition procedure could be set to commence immediately after the sheet-feeding mechanism 20 starts to operate.

In this embodiment, two documents P1 and PF are described. One of ordinary skill in the art may easily understand that the scanner of the invention is not limited thereto.

Figure 4:
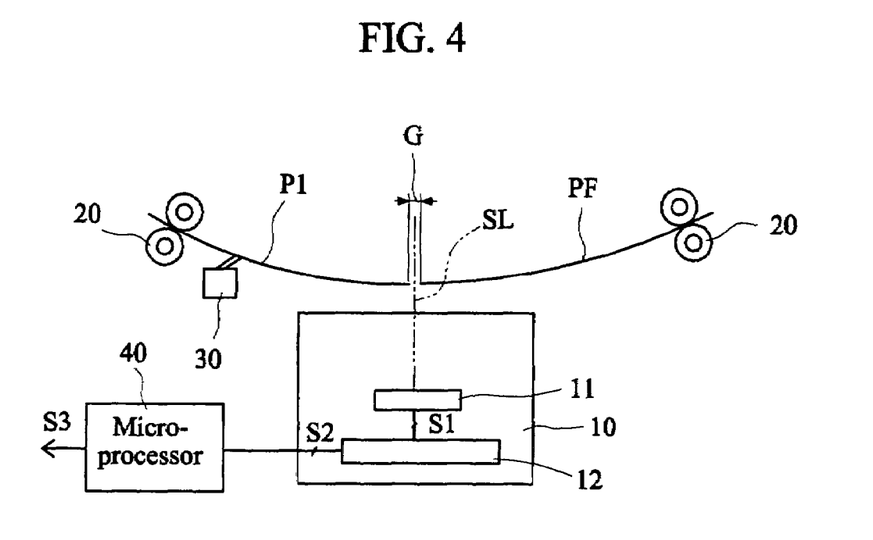
Figure 5:
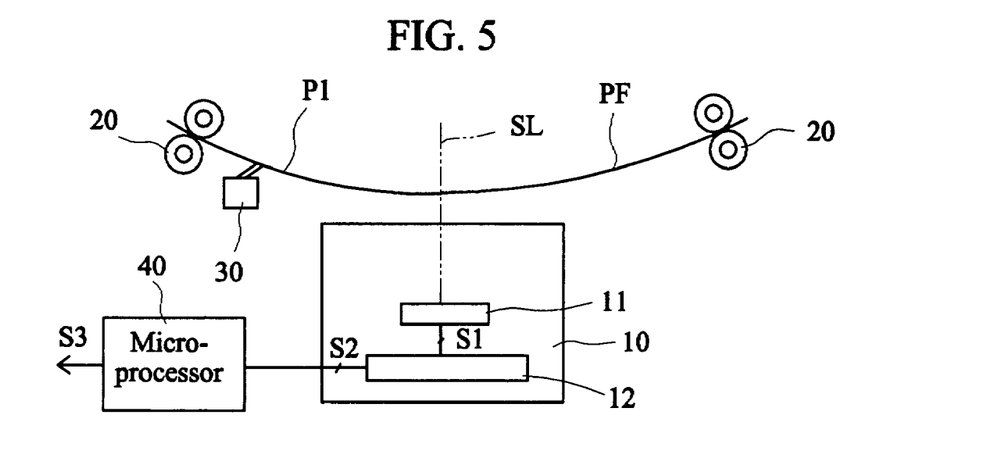

The documents P1 and PF may be separated from each other, as shown in FIG. 4. In this case, a gap G between the two documents may exist. Alternatively, no gap between the two documents may exist, as shown in FIG. 5. When the scanning module scans the gap G, the obtained image may serve as a reference for the page-separating procedure.

Also, the documents P1 and PF may be two sheets of paper connected to each other, like the continuous form paper used in a dot matrix printer, where a folding line exists between the documents P1 and PF. In this case, no gap G exists between the two documents, as shown in FIG. 5. And the image of the folding line may also serve as a reference for the page-separating procedure.

Figure 7:
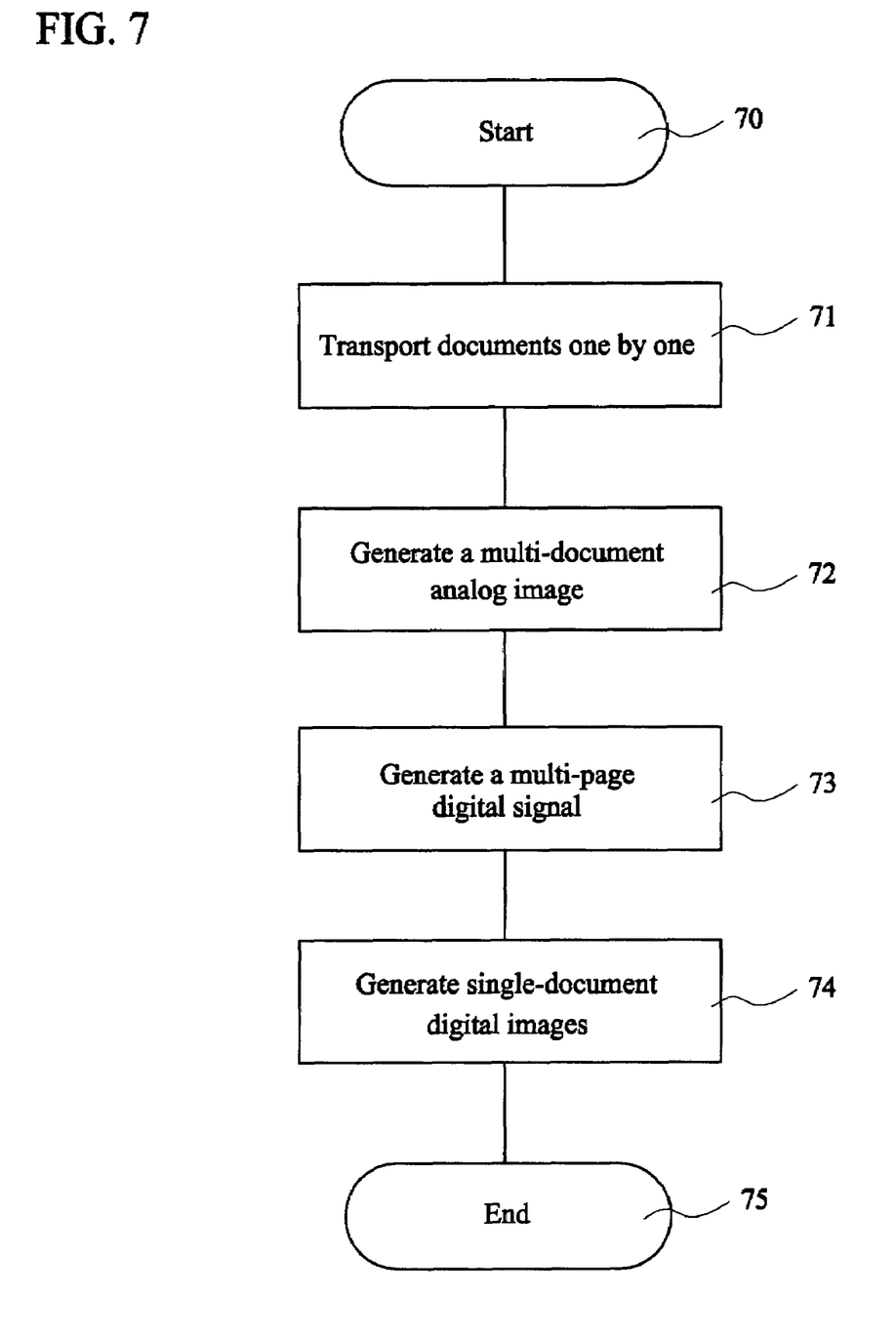
FIG. 7 is a flow chart showing the method of generating the image of the single document according to the invention.

FIG. 7 is a flow chart showing the method of generating the image of the single document according to the invention. Referring to FIGS. 7, and 3 to 6, the method of generating the image of the single document according to the invention includes the following steps.

In step 70, the method starts.

In step 71, the method includes transporting the documents P1 and PF across the scan position SL one by one. The scan position SL corresponds to an optical path from the document to the photosensor 11.

In step 72, the method includes starting reading the documents at the scan position SL before the first document P1 of the documents reaches the scan position SL and reads the documents continuously until the last document PF of the documents is completely transported across the scan position SL to generate the multi-document analog image S1. The multi-document analog image S1 may also be outputted in segments.

In step 73, the method includes converting the multi-document analog image S1 into the multi-document digital image S2. The multi-document digital image S2 may also be generated in segments.

In step 74, the method includes processing the multi-document digital image S2 to generate a plurality of single-document digital images S3 corresponding to the documents P1 and PF.

In step 75, the method ends.

Figure 8:
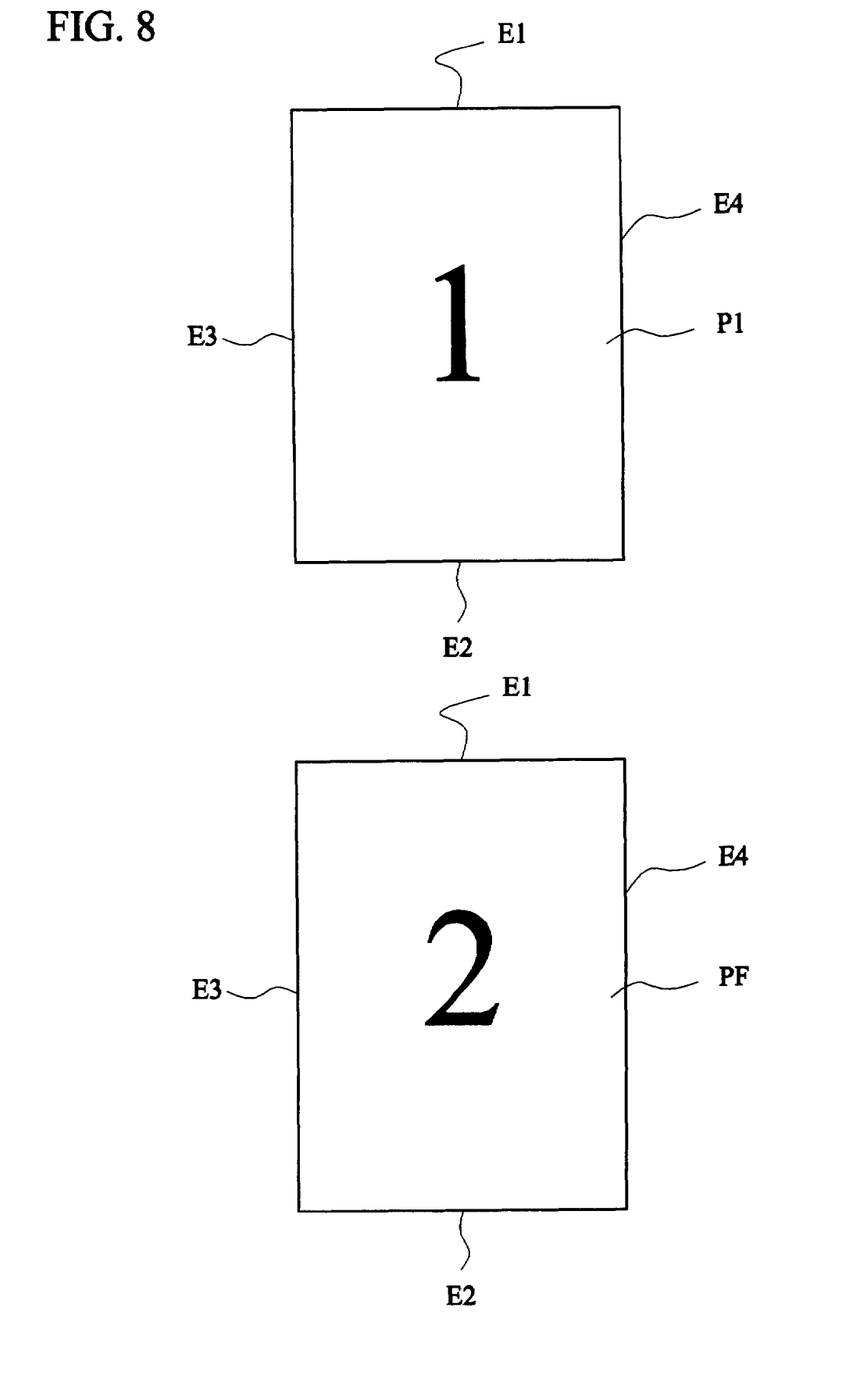
FIG. 8 is a schematic illustration showing a plurality of documents used in the method of generating the image of the single document according to the invention.

FIG. 8 is a schematic illustration showing a plurality of documents used in the method of generating the image of the single document according to the invention. Referring to FIG. 8, each of the documents P1 and PF includes a leading edge E1, a trailing edge E2, a left edge E3 and a right edge E4.

Figure 9:
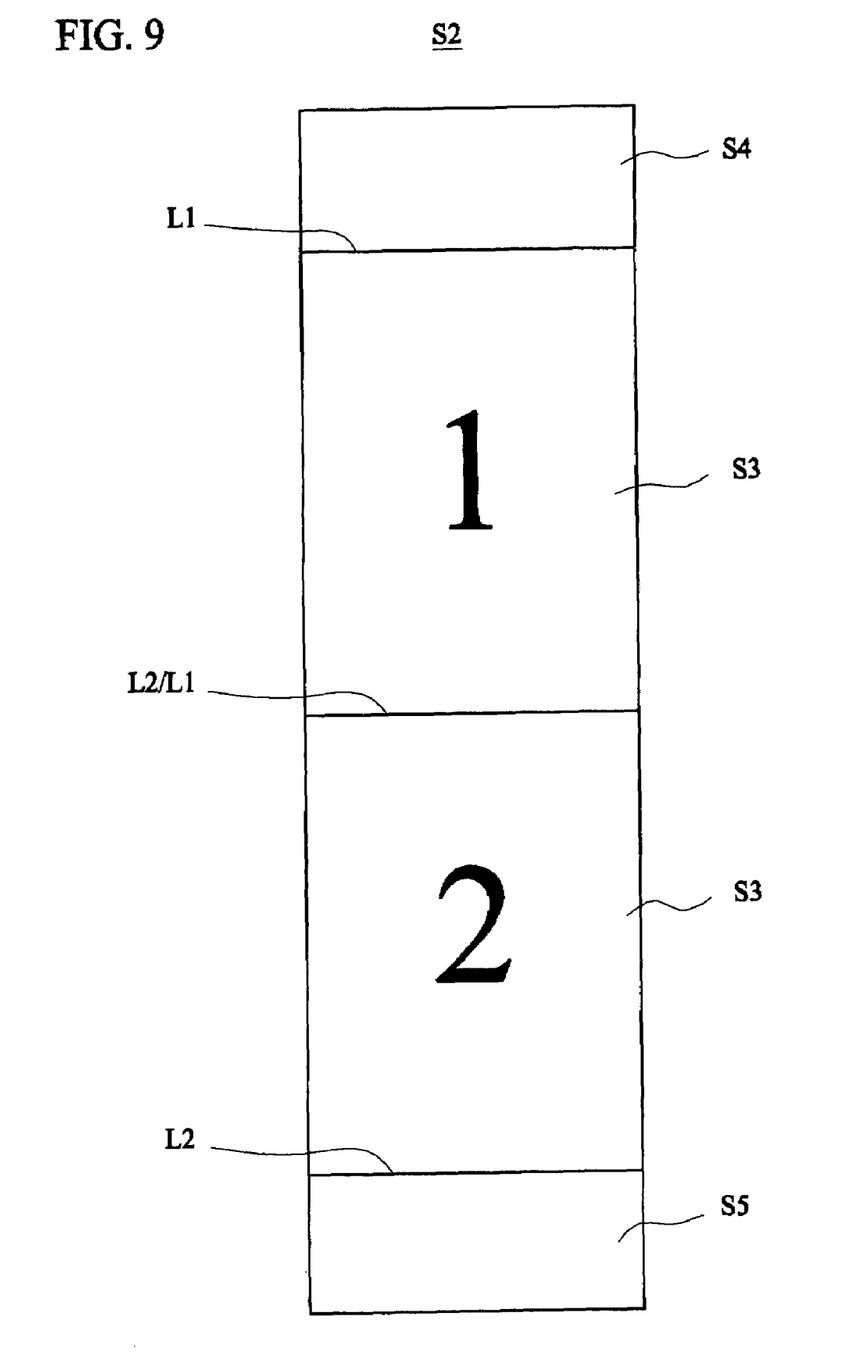
FIG. 9 is a schematic illustration showing an image corresponding to a multi-document digital image S2 according to the invention.

FIG. 9 is a schematic illustration showing the multi-document digital image S2 obtained according to the invention. As shown in FIG. 9, the multi-document digital image S2 includes a plurality of leading edge segments L1 and a plurality of trailing edge segments L2, where the leading edge segment L1 and the trailing edge segment L2 respectively correspond to images of the leading edge E1 and the trailing edge E2 of each of the documents. Herein, geometric patterns are utilized to represent various signals, and one of ordinary skill in the art may easily understand the meanings of the signals.

As shown in FIGS. 8 and 9, the step of processing the multi-document digital image includes the following steps. First, the leading edge segment L1 and the trailing edge segment L2 are being located. Next, the multi-document digital image S2 is cropped according to the leading edge segments L1 and the trailing edge segments L2 to generate the single-document digital images S3. As for the meaning in the aspect of the geometric pattern, the front and rear redundant portions are cropped out, and the images of two pages are separated from each other. Alternatively, when the scan width and the sheet size (such as the A4 size) are definite, it is possible to locate the trailing/leading edge segments L2/L1 according to the leading/trailing edge segments L1/L2 or directly generate the single-document digital image, and then the multi-document digital image S2 is cropped according to the leading/trailing edge segments and document size signals corresponding to sizes of the documents to generate the single-document digital images S3. It is noted that the leading edge segments L1 and the trailing edge segments L2 of the multi-document digital image S2 may be used to define boundaries of the single-document digital images S3 and boundaries of background image portions S4 and S5 to be discarded.

Figure 10:
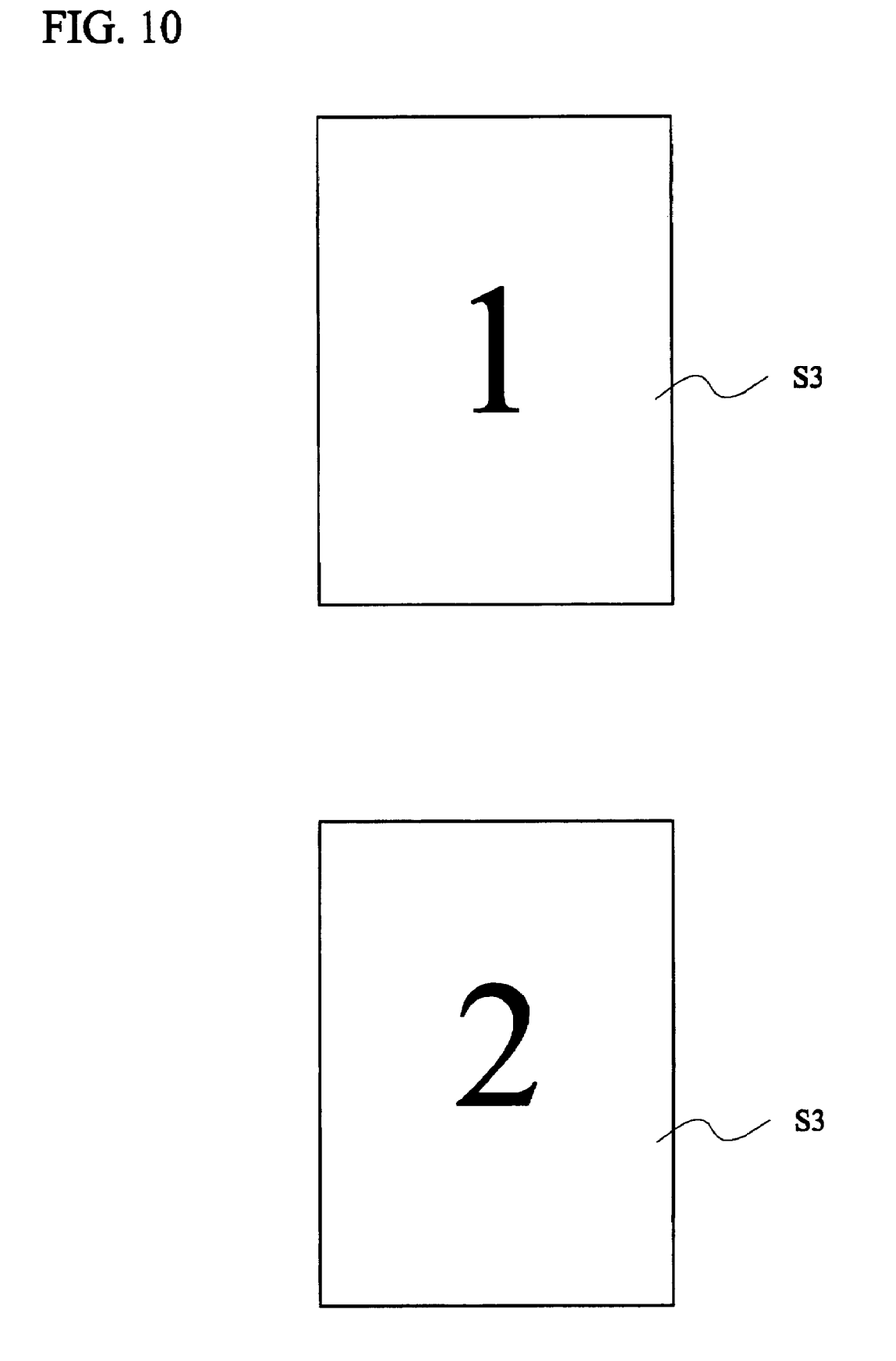
FIG. 10 is a schematic illustration showing images corresponding to a plurality of single-document digital images according to the invention.

FIG. 10 is a schematic illustration showing images corresponding to the plurality of single-document digital images S3 according to the invention. As shown in FIG. 10, the single-document digital images S3 are generated after the processing procedure.

Figure 11:
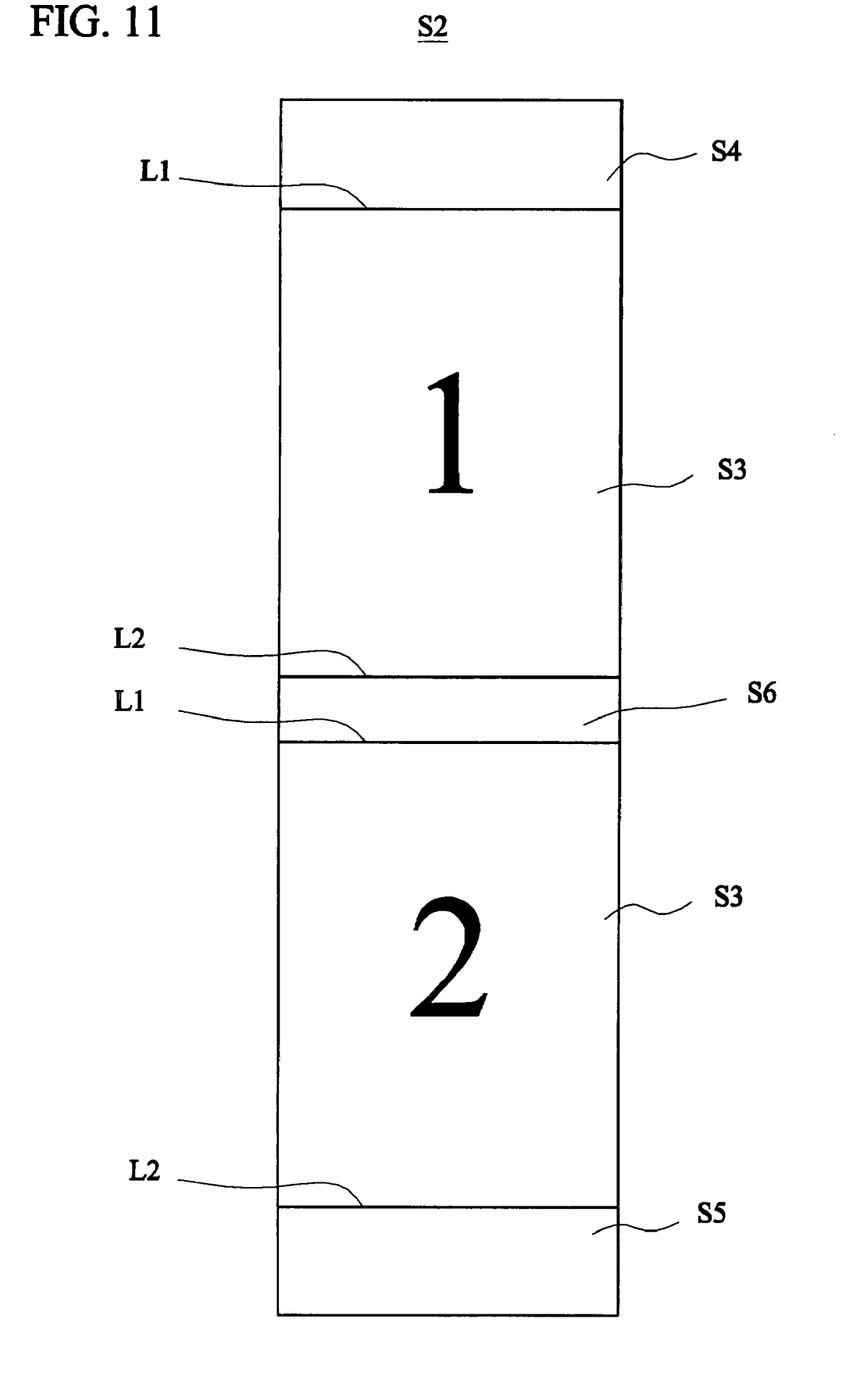
FIGS. 11 to 15 show several examples in the method of generating the image of the single document according to the invention.

FIGS. 11 to 15 show several examples of the method of generating the image of the single document according to the invention. FIG. 11 shows another example of the multi-document digital image S2. In this example, in addition to the background image portions S4 and S5 illustrated in FIG. 9, another background image portions S6 is obtained due to the gap G between the documents P1 and PF. The detailed description of the common features illustrated in FIGS. 9 and 11 shall not be repeated hereinafter. In this case, the step of processing the multi-document digital image S2 includes the following steps. First, the leading edge segments L1 and the trailing edge segments L2 are being located. Then, the multi-document digital image S2 is cropped according to the leading edge segments L1 and the trailing edge segments L2 so that the single-document digital images S3 are generated. As for the meaning in the aspect of the geometric pattern, the front, rear and middle redundant portions are cropped out so that the images can be separated. It is noted that the leading edge segments L1 and the trailing edge segments L2 of the multi-document digital image S2 may be used to define boundaries of the single-document digital images S3 and boundaries of background image portions S4, S5 and S6 to be discarded.

Figure 12:
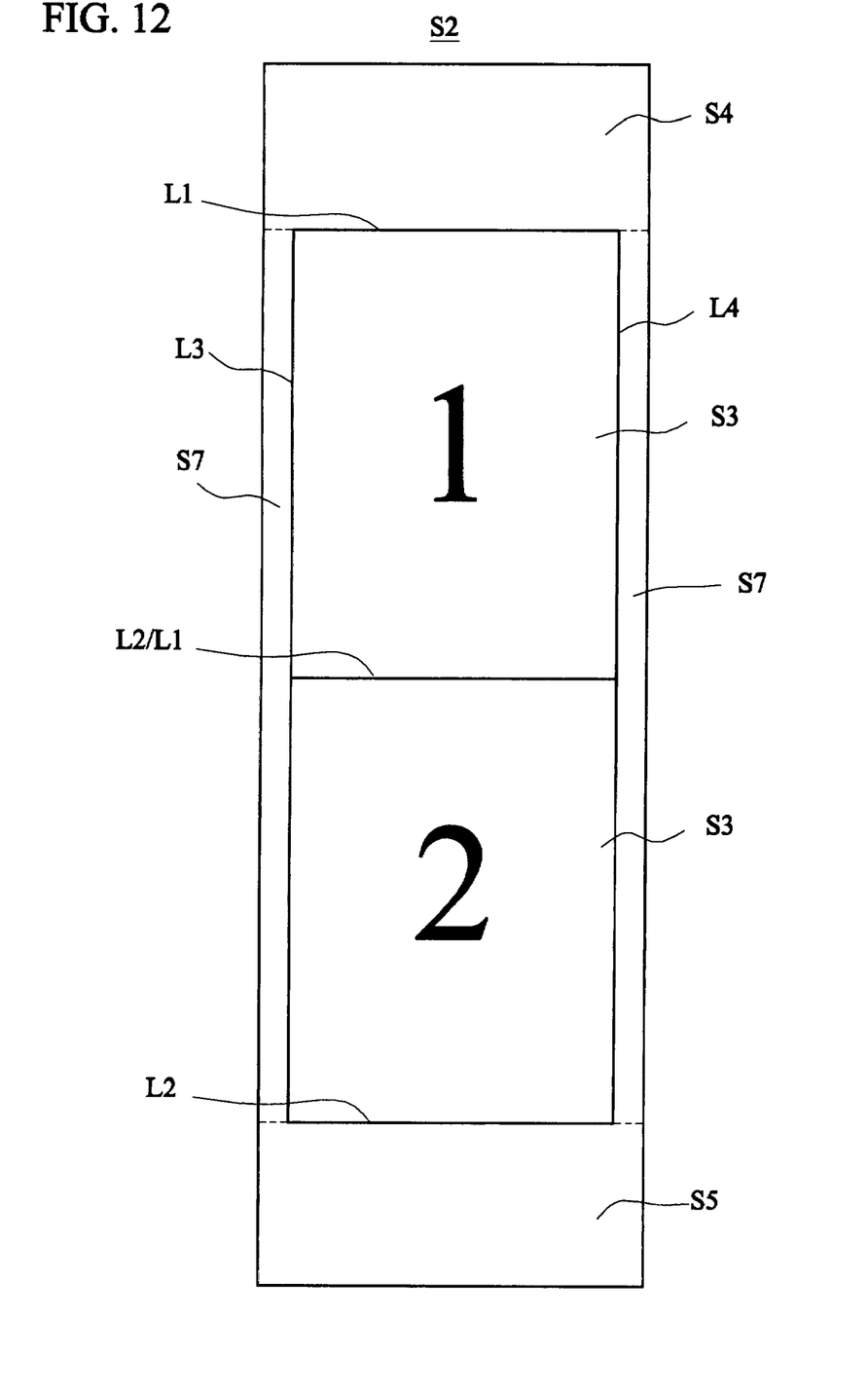

FIG. 12 shows an example of the multi-document digital image S2 containing a width greater than a width of each document. The multi-document digital image S2 includes a plurality of leading edge segments L1, a plurality of side edge segments L3 and L4 and a plurality of trailing edge segments L2, where the leading edge segment L1, the side edge segments L3 and L4, and the trailing edge segment L2 respectively correspond to images of the leading edge E1, the side edges E3 and E4, and the trailing edge E2 of each of the documents. In this case, the step of processing the multi-document digital image S2 comprises the steps of: locating the leading edge segments L1, the trailing edge segments L2, the side edge segments L3 and L4; and cropping the multi-document digital image S2 according to the leading edge segments L1, the trailing edge segments L2, the side edge segments L3 and L4 to generate the single-document digital images S3. Similarly, when the scan width and the sheet size (such as the A4 size) are definite, it is possible to locate the trailing/leading edge segments L2/L1 according to the leading/trailing edge segments L1/L2 and the right/left side edge segments L4/L3 according to the left/right side edge segments L3/L4, or directly generate the single-document digital image S3. As for the meaning in the aspect of the geometric pattern, the front, rear, left and right redundant portions are cropped out, and then the images of the two pages are separated from each other. It is noted that the leading edge segments L1, the side edge segments L3 and L4, and the trailing edge segments L2 of the multi-document digital image S2 may be used to define boundaries of the single-document digital images S3 and boundaries of background image portions S4, S5 and S7 to be discarded.

Figure 13:
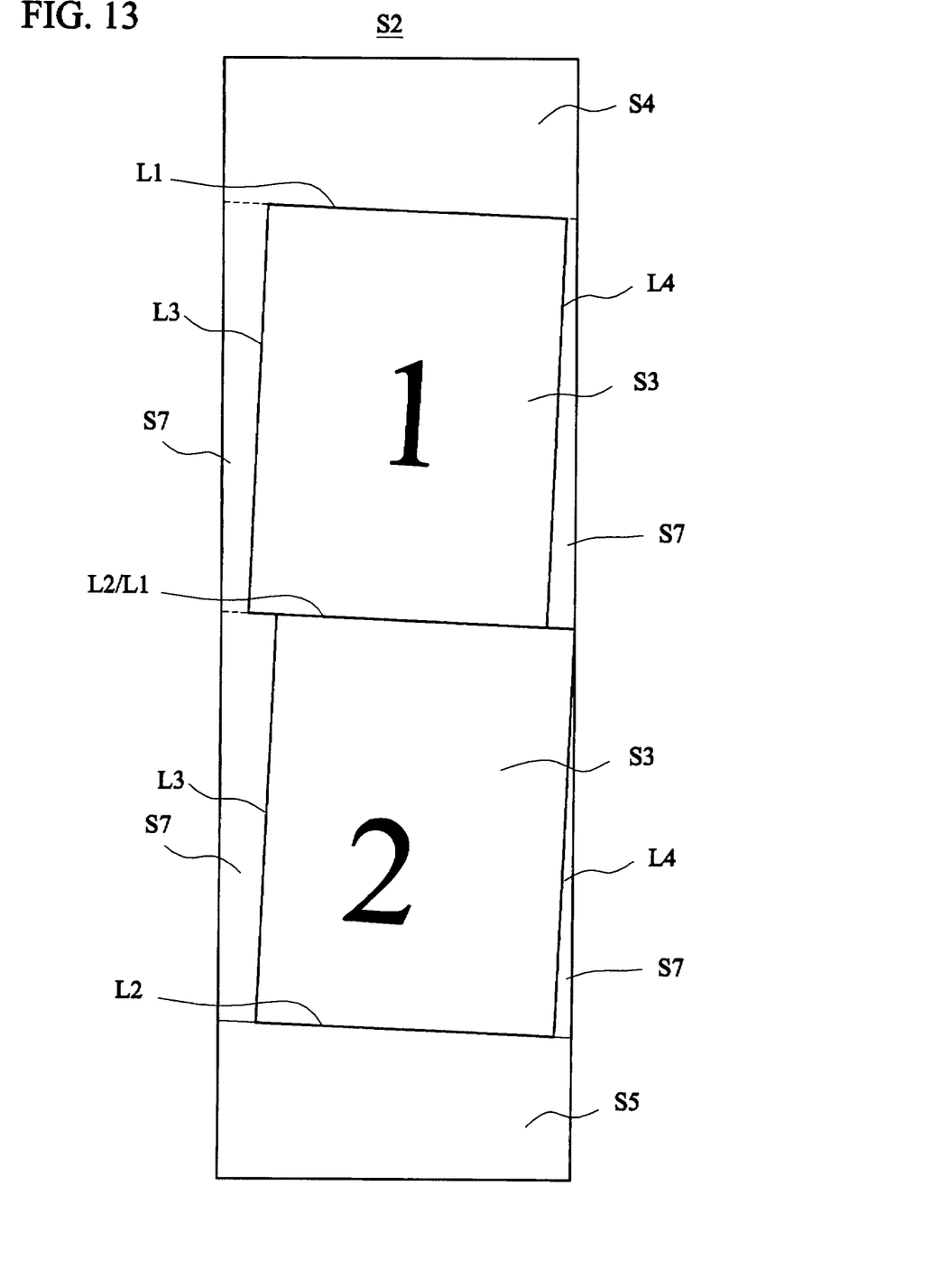

FIG. 13 shows another example of the multi-document digital image S2 containing a width greater than the width of each document, where a skew of the documents P1 and PF is introduced. The detailed description of the common features illustrated in FIGS. 12 to 15 shall not be repeated hereinafter. In this case, the step of processing the multi-document digital image S2 includes the following steps. First, the leading edge segments L1, the trailing edge segments L2 and the side edge segments L3 and L4 are being located. Then, the multi-document digital image S2 is cropped and de-skewed according to the leading edge segments L1, the trailing edge segments L2 and the side edge segments L3 and L4, so that the single-document digital images S3 are generated. Thus, in addition to the steps illustrated in the example of FIG. 12, the step of processing the multi-document digital image S2 further comprises the step of: de-skewing the multi-document digital image S2 according to the leading and trailing edge segments L1 and L2, the side edge segments L3 and L4. As for the meaning in the aspect of the geometric pattern, the front and rear redundant portions are cropped out, then the image is de-skewed, and then the images of the two pages are separated from each other.

Figure 14:
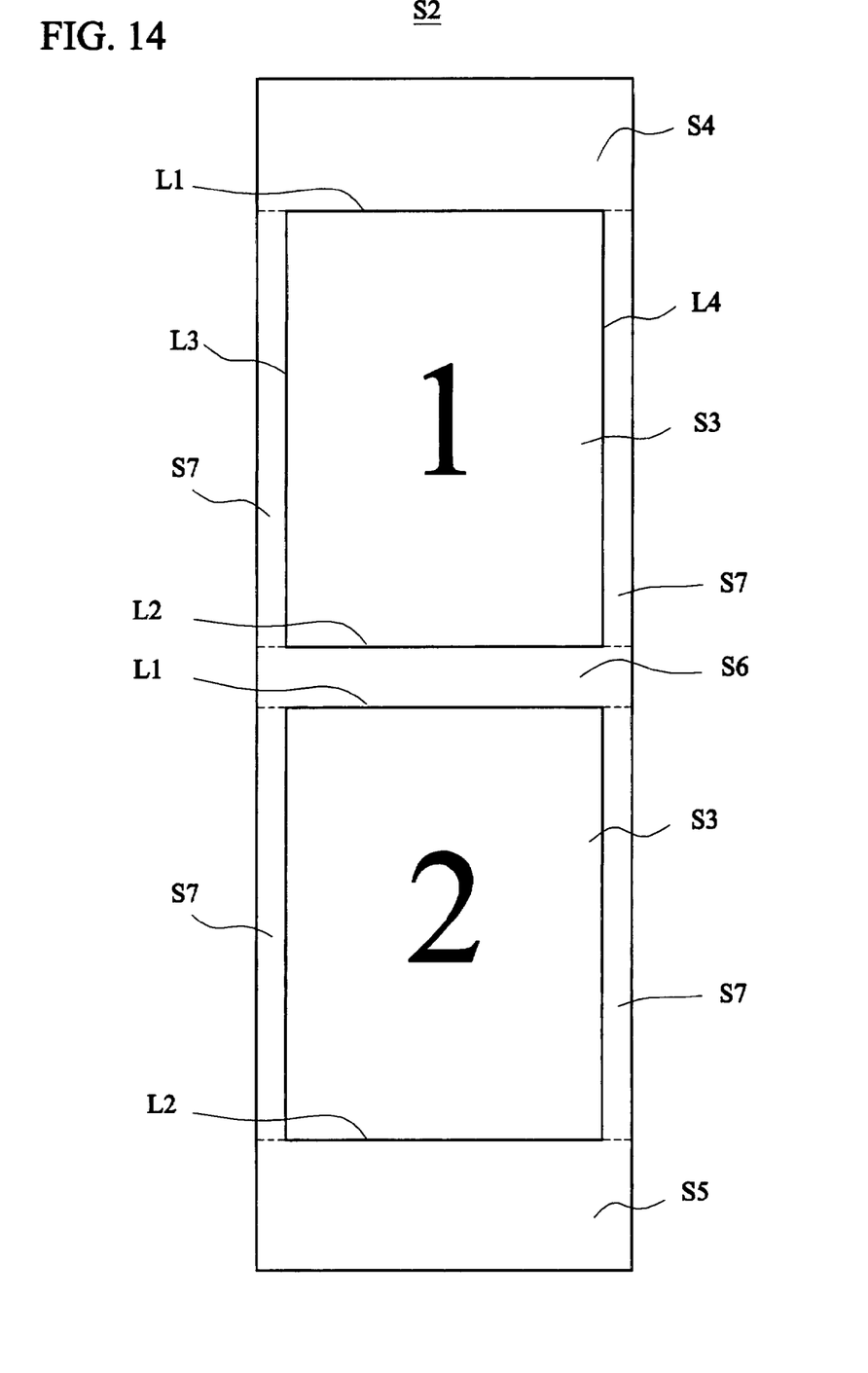

FIG. 14 shows another example of the multi-document digital image S2 containing a width greater than the width of each document, where the gap G between the documents P1 and PF takes place when the documents P1 and PF are being fed. The step of processing the multi-document digital image S2 includes the following steps. First, the leading edge segments L1, the trailing edge segments L2, the side edge segments L3 and L4 are being located. Then, the multi-document digital image S2 is cropped according to the leading edge segments L1, the trailing edge segments L2, the side edge segments L3 and L4 to generate the single-document digital images S3. As for the meaning in the aspect of the geometric pattern, the front, rear, left and right redundant portions are cropped out and then the images of the two pages are separated from each other. In this case, the leading edge segments L1, the trailing edge segments L2 and the side edge segments L3 and L4 of the multi-document digital image S2 may be used to define boundaries of the single-document digital images S3 and boundaries of background image portions S4, S5, S6 and S7 to be discarded.

Figure 15:
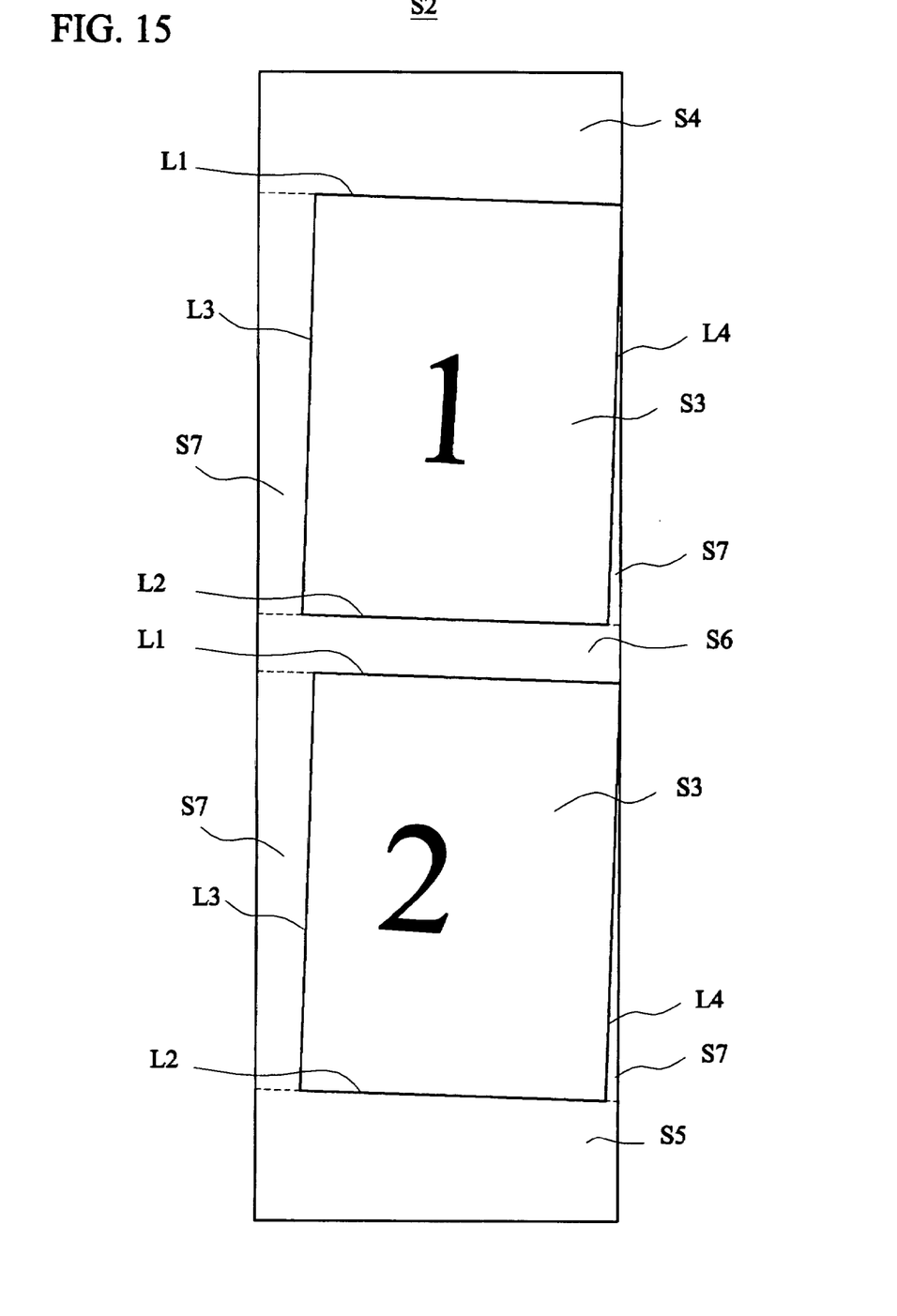

As shown in FIG. 15, this example is different from that of FIG. 14 in that the skew exists in FIG. 15, so the page-separating procedure includes the skew correction and the boundary selection. Thus, the step of processing the multi-document digital image S2 further includes a step of de-skewing the multi-document digital image S2 according to the leading edge segments L1, the trailing edge segments L2 and the side edge segments for the purpose of the generation of the single-document digital images S3.

According to the method of the invention, it is possible to eliminate the problem of the lost portion in the scanned result, which is caused by the incorrect leading edge detection of the document, and it is also possible to eliminate the drawback caused by the lost portion in the scanned result, which is caused by the skew of the document.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A method of generating an image of a single document, the method comprising the steps of:
   transporting a plurality of documents across a scan position one by one;
   starting reading the documents at the scan position before a first document of the plurality of documents reaches the scan position, and reading the documents continuously until a last document of the documents is completely transported across the scan position to generate a multi-document analog image;
   converting the multi-document analog image into a multi-document digital image; and
   processing the multi-document digital image to generate a plurality of single-document digital images corresponding to the documents.

2. The method according to claim 1, wherein the multi-document digital image comprises a plurality of leading edge segments and trailing edge segments, wherein the leading edge segment and the trailing edge segment respectively correspond to images of a leading edge and a trailing edge of each of the documents.

3. The method according to claim 2, wherein the step of processing the multi-document digital image comprises the steps of:
   locating the leading edge segments and the trailing edge segments; and
   cropping the multi-document digital image according to the leading edge segments and the trailing edge segments to generate the single-document digital images.

4. The method according to claim 2, wherein the step of processing the multi-document digital image comprises the steps of:
   locating the leading/trailing edge segments; and
   cropping the multi-document digital image according to the leading/trailing edge segments and document size signals corresponding to sizes of the documents to generate the single-document digital images.

5. The method according to claim 2, wherein the leading edge segments and the trailing edge segments of the multi-document digital image define boundaries of the single-document digital images and boundaries of background image portions to be discarded.

6. The method according to claim 1, wherein the multi-document digital image contains a width greater than a width of each of the documents.

7. The method according to claim 6, wherein the multi-document digital image comprises a plurality of leading edge segments, trailing edge segments and side edge segments, wherein the leading edge segment, the trailing edge segment and the side edge segment respectively correspond to images of a leading edge, a trailing edge and a side edge of each of the documents.

8. The method according to claim 7, wherein the step of processing the multi-document digital image comprises the steps of:
   locating the leading edge segments, the trailing edge segments and the side edge segments; and
   cropping the multi-document digital image according to the leading edge segments, the trailing edge segments and the side edge segments to generate the single-document digital images.

9. The method according to claim 8, wherein the step of processing the multi-document digital image further comprises the step of:
   de-skewing the cropped multi-document digital image according to the leading edge segments, the trailing edge segments and the side edge segments.

10. The method according to claim 7, wherein the step of processing the multi-document digital image comprises the step of:
   locating the leading/trailing edge segments and side edge segments; and
   cropping the multi-document digital image according to the leading/trailing edge segments, the side edge segments and document size signals corresponding to sizes of the documents to generate the single-document digital images.

11. The method according to claim 7, wherein the leading edge segments, the trailing edge segments and the side edge segments of the multi-document digital image define boundaries of the single-document digital images and boundaries of background image portions to be discarded.

* * * * *